United States Patent [19]

Wallstén

[11] 4,164,174
[45] Aug. 14, 1979

[54] METHOD OF PREPARING FOODSTUFFS BY MEANS OF BOILING OR STEAMING AND MEANS FOR PERFORMING THE METHOD

[76] Inventor: Hans I. Wallstén, Chemin de la Lisiere 6, CH-1018 Lausanne, Switzerland

[21] Appl. No.: 687,707

[22] Filed: May 19, 1976

[30] Foreign Application Priority Data

Nov. 12, 1975 [CH] Switzerland .................. 126888/75

[51] Int. Cl.² ........................................... A47J 37/12
[52] U.S. Cl. ..................................... 99/415; 99/418; 229/3.5 MF
[58] Field of Search .......... 99/415, 325, 347, 359–360, 99/403, 410–414, 416–418, 425, 428, 444, 446, 450, 467, 329 R; 126/25, 390, 377; 220/65, 13, 63; 229/3.5 MF; 426/509, 232

[56] References Cited

U.S. PATENT DOCUMENTS

| | | | |
|---|---|---|---|
| 1,330,868 | 2/1920 | Harrison | 99/403 |
| 1,955,745 | 4/1934 | Hurley | 229/3.5 MF X |
| 2,907,659 | 10/1959 | Anetsberger et al. | 99/410 X |
| 3,130,288 | 4/1964 | Monaco et al. | 220/13 X |
| 3,240,610 | 3/1966 | Cease | 126/390 UX |
| 3,531,300 | 9/1970 | Greenberg et al. | 99/325 X |
| 3,636,860 | 1/1972 | Green | 99/410 |
| 3,808,963 | 5/1974 | Ludena | 99/417 |
| 3,946,654 | 3/1976 | Janssen | 99/410 X |
| 4,026,435 | 5/1977 | Hendon | 99/403 X |

*Primary Examiner*—Harvey C. Hornsby
*Assistant Examiner*—Arthur O. Henderson
*Attorney, Agent, or Firm*—Lerner, David, Littenberg & Samuel

[57] ABSTRACT

The method and apparatus for preparing foodstuffs by boiling and/or steaming including a thin walled and, hence, crushable insert having water-tight properties and mounted within a porous structure providing support for the thin walled insert, and holding the insert in a spaced fashion relative to the bottom and side walls of a cooking vessel, thereby forming the equivalent of a heat pipe structure in the hollow gap space between the insert support and the cooking vessel. For foodstuff preparation by boiling, water may be added to both the vessel interior and the insert interior, the foodstuffs being placed within the insert.

The insert may be provided with a lip bridging the aforesaid gap to facilitate filling or emptying of the insert without spilling the insert contents into the vessel, thereby keeping it substantially clean. The aforesaid lip may completely surround the insert and overlie the gap, suitable openings being provided to permit the escape of steam therethrough.

The vessel may be employed with steam generating apparatus provided either independently of or in combination with heating apparatus such as the hot plate, for example.

14 Claims, 17 Drawing Figures

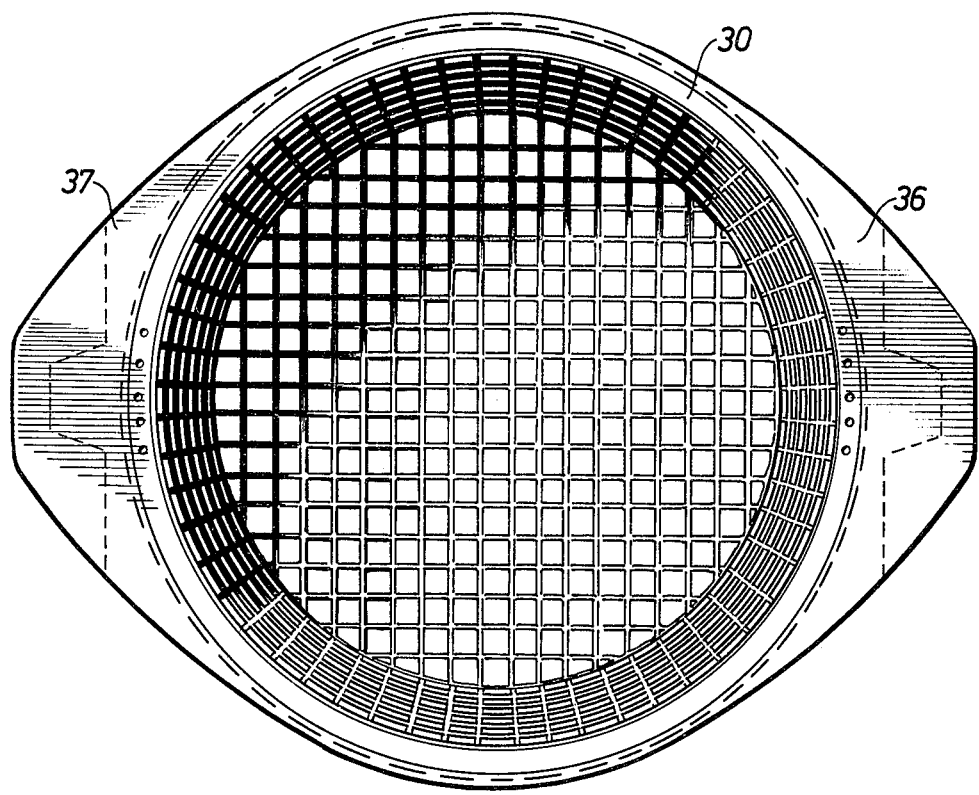
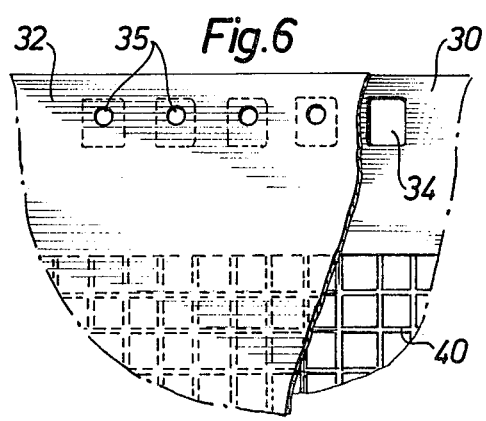

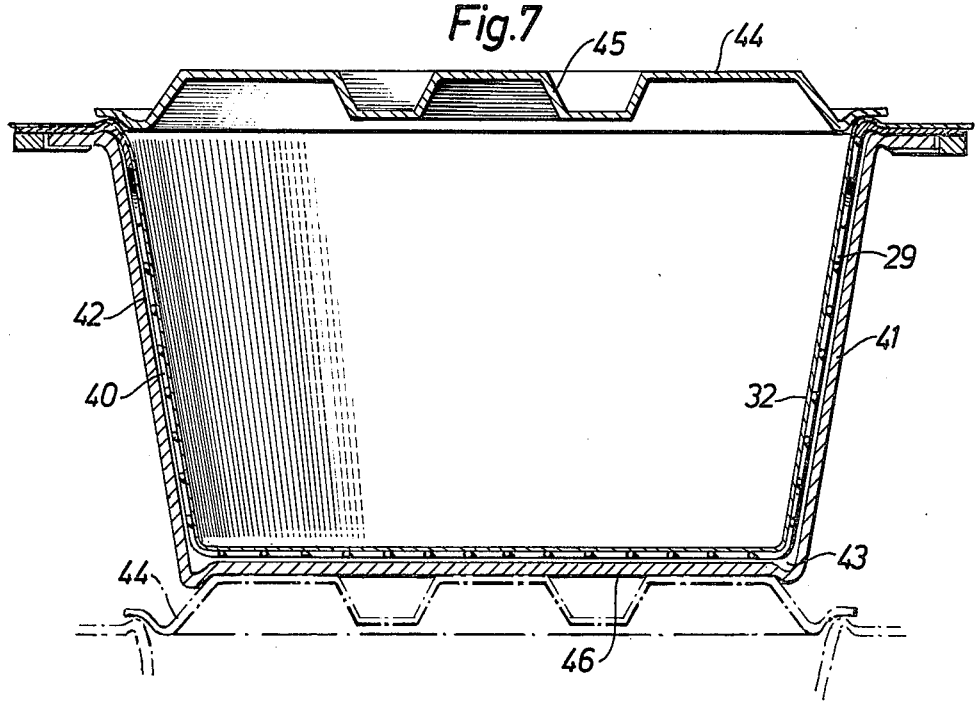
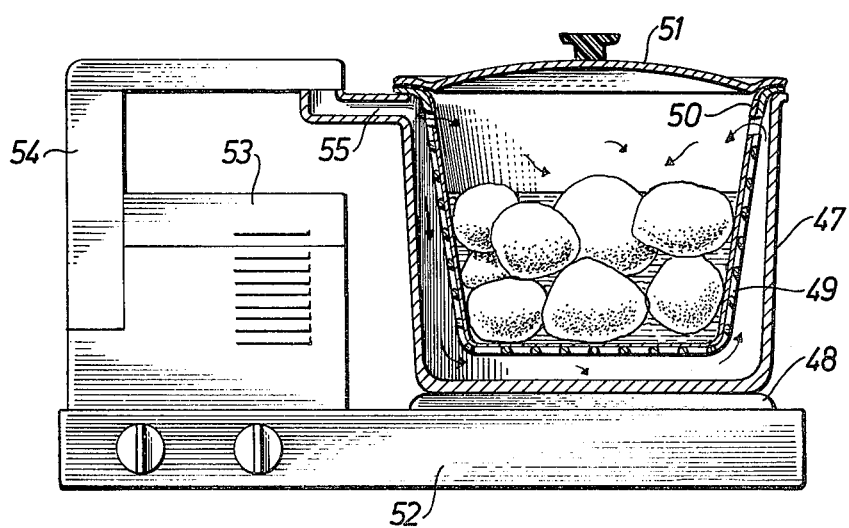

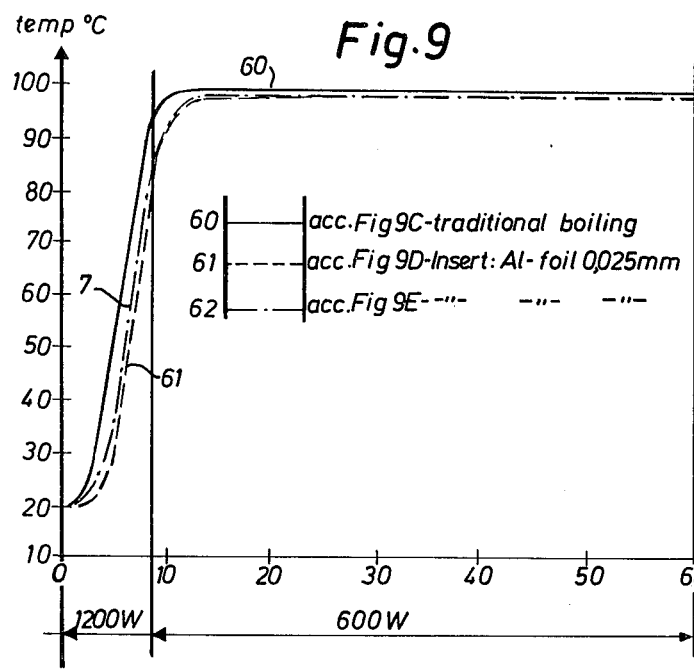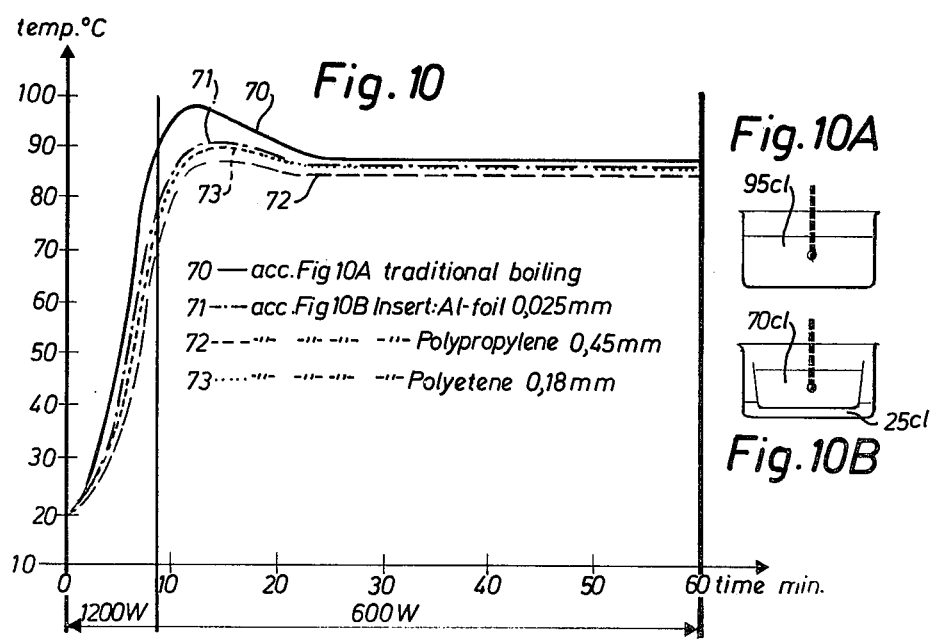

METHOD OF PREPARING FOODSTUFFS BY MEANS OF BOILING OR STEAMING AND MEANS FOR PERFORMING THE METHOD

BACKGROUND OF THE INVENTION

The present invention relates to a method and means for preparing foodstuffs or the like by means of boiling and/or steaming.

When boiling food in cooking vessels it is usually impossible to avoid deposits on the bottom and walls of the cooking vessel. In certain cases these deposits are extremely difficult to remove by cleaning. For this reason it is in many cases impossible to clean the cooking vessel in a satisfactory manner in a dishwasher, for instance, and it is only with difficulty that it can be cleaned manually. The deposits may also contain flavoring matter which adds to the difficulty of cleaning. As is known, thus, it is difficult to clean vessels which have been used for boiling potatoes, certain other vegetables, fish and so on. In the preparation of food containing fat such as sauces, purees, milk, a fat deposit is also obtained on the inner surface of the cooking vessel, which also makes cleaning difficult.

Attempts have been made to place an insert of disposable character in the cooking vessel, the insert—consisting of aluminum foil for example—being designed to be in contact with the inner wall and the bottom of the cooking vessel.

However, it has been found that for various reasons such an arrangement is not feasible. In the first place there is a considerable risk of water or other liquid remaining between the bottom of the vessel, for instance, and the insert. During heating this may result in violent expulsion of steam, so much so that even the contents of the vessel may be partially expelled. This is because the water between the bottom of the vessel and the insert is rapidly vaporized and expands. However, because of the pressure exerted by the insert from above, the steam is enclosed in a pocket resulting in strong over-pressure until the steam forces a path between the insert and the vessel.

The above arrangement is also unsuitable because it is difficult to find a heat-resistant material with good heat-transfer properties. Good heat-resistance is necessary because extremely high temperatures may occur locally on the insert wall due to the direct contact between insert and cooking vessel. Even if aluminum foil is used for the insert, which in itself has good heat-resistance and good heat-conductivity, it is difficult to fit this to the shape of the cooking vessel so that no pockets of air, steam or water are formed between the vessel and the insert. This gives considerably reduced heat-conductivity and thus less economic heating. Furthermore, unless coated with plastic, for instance, aluminum foil is scarcely corrosion-resistant and is also sensitive to mechanical action. If a hole appears in the foil caused by corrosion or mechanically, liquid will leak out between cooking vessel and insert, resulting in the expulsion of air mentioned above. If, on the other hand, the foil is coated with plastic, it loses its heat resistance and the plastic may burn because of the high temperatures which may occur.

It has now been found that the difficulties and drawbacks mentioned above can be eliminated by means of the present invention.

In the method proposed according to the invention, the problem is solved substantially in that the foodstuff to be cooked is placed in a disposable, liquid-tight film or foil insert, open at the top, and that the disposable insert is spaced from the bottom and walls of a cooking vessel, possibly by means of a supporting holder surrounding the insert and allowing steam to pass through, so that a gap is formed and the foodstuff placed in the disposable insert is heated through the action of steam or water and steam in the gap.

According to a suitable embodiment of the invention the disposable insert is positioned in the cooking vessel by means of a supporting holder provided with steam passages. The combination of a thin insert of disposable type and a supporting holder surrounding the insert forms a unit during the cooking process. The supporting holder or casing is provided in suitable manner with passages for water vapor and water, for instance, in the form of perforations or by at least parts of the casing being made of stiffened mesh. The casing may thus consist of a wire basket. The unit formed by insert and casing should be designed so that when used for cooking in an ordinary cooking vessel, it is slightly smaller in height and diameter than the cooking vessel so that a space is obtained between the cooking vessel and the unit.

When preparing food by boiling, for instance, water is poured into the cooking vessel up to a suitable level. If the vessel is placed on a hot-plate the water in the bottom of the vessel will be brought to boil. Steam will be produced and at least some of this steam will condense on the outer surface of the insert, the heat being transmitted through the wall of the insert to the foodstuff. If the level of the water is sufficiently high in the cooking vessel for it to come into contact with the bottom of the unit, heat may also be conducted directly through the casing and the insert. Some of the steam produced by the boiling water may also be directed in suitable manner over the upper edge of the insert so that the steam condenses directly on the foodstuff.

If water or other liquid leaks through a hole in the insert into the space between the insert and cooking vessel, there is no risk of explosive puffs. Furthermore, the material need not be especially heat-resistant since the casing is separated from at least the bottom of the vessel and the temperature of the insert walls will not therefore exceed 100° C. during cooking. Further features of the invention are revealed in the accompanying claims.

BRIEF DESCRIPTION OF THE FIGURES

The invention will be further described in the following with reference to some embodiments shown by way of example in the accompanying drawings, in which

FIG. 5 shows the means according to FIG. 4 seen from above.

FIG. 6 shows an enlargement of a part of the supporting holder shown in FIG. 4.

FIG. 7 is a section of a serving dish designed to take the means proposed according to the invention.

FIG. 8 shows a section through a fourth embodiment of the invention.

FIG. 9 9C, 9D and 9E is a temperature-time chart of the cooking process using a means as shown in FIG. 4.

FIG. 10 10A and 10B is a temperature-time chart over experiments performed using a means operating substantially in accordance with that in FIG. 1.

DETAILED DESCRIPTION OF THE INVENTION

Figure 1:
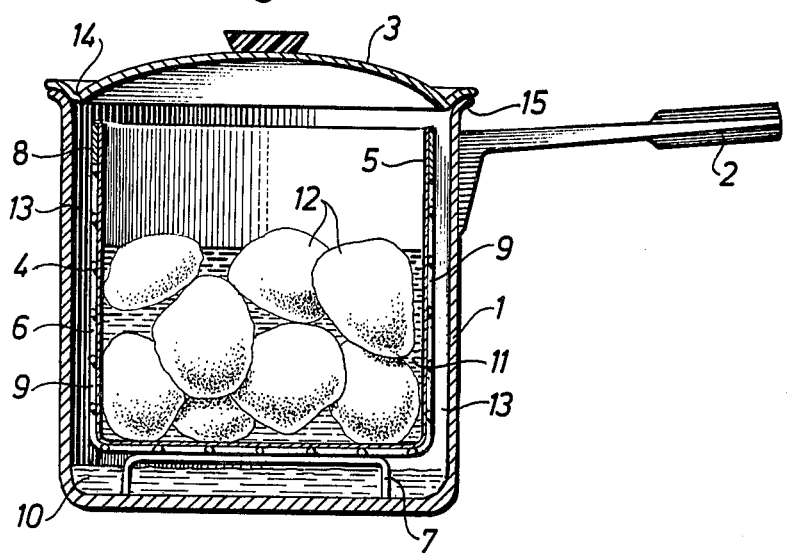
FIG. 1 is a section through a first embodiment of the invention.

In FIG. 1, 1 designates a conventional cooking vessel which in this case has a handle 2.

The cooking vessel is provided with a lid 3. A unit 4 according to the invention is placed in the cooking vessel, said unit comprising a thin liquid-tight and heat-conducting insert 5 surrounded by a supporting holder or casing 6. The casing 6 is relatively rigid and in the embodiment shown in FIG. 1 is placed on a spacer 7 which in turn rests on the bottom of the vessel 1. Both casing 6 and insert 5 are substantially cylindrical and are open at the top, i.e., to the lid 3. The casing 6 has preferably a reinforcing ring 8 about its upper edge. A number of apertures 9 are provided in the casing 6. In the embodiment shown here the casing consists of the upper ring 8 and a perforated surface. Water 10 is filled to a suitable level in the vessel 1. Suitable lateral spacers are arranged so that the unit 4 is centered symmetrically in relation to the vertical axis of symmetry of the vessel 1, i.e., so that the space between the inner wall of the cooking vessel and the unit 4 is substantially the same all around the wall of the cooking vessel 1. Water 11 is placed in the insert 5 to a certain level so that it at least partially covers the foodstuff 12 in the insert 5 which is to be cooked.

To boil foodstuff in accordance with the invention, using the means shown in FIG. 1, the cooking vessel 1 is preferably placed on a hot-plate or some other source of heat. As with traditional boiling, the water 10 in the lower space of the vessel should preferably be brought to boil rapidly, that is to say with the hot-plate set at maximum heat. During the heating process steam will gradually be produced by the water 10. First of all the steam will come into contact with the cooler wall of the insert 5, whereupon the steam will condense thus liberating heat through the thin insert 5 to the water 11 and the foodstuff 12.

As heat is supplied to the foodstuff 12 its temperature increases and a certain amount of excess steam passes through the space 13 between insert 5 and the wall of the vessel. In the means illustrated, some of the steam can pass over the upper edge of the unit 4 and will also partially condense on the exposed surface of the water 11 and the foodstuff so that heat is also transferred in this manner. Furthermore, as with traditional boiling, there will be a certain amount of condensation against the lid 3, this preferably being provided with a drip edge 14 in known manner. As the heating process continues excess steam will find its way to the surroundings, as with traditional boiling, either by passing between the upper lip 15 of the cooking vessel and the corresponding edge of the lid 3 or through apertures provided in the vessel or the lid for this purpose.

As with traditional boiling, an increasing quantity of excess steam reaching the surroundings indicates that the heating up stage is almost over and that it is advisable to reduce the heat. By setting the heat at a lower value the quantity of excess steam can be kept down. As described earlier, the quantity of water 10 at the bottom of the cooking vessel in this example is so small that the surface of the water does not quite reach the bottom of the casing. In the case described, the effect will be that of a heat pipe. The steam from the water 10 will condense on the surface of the insert 5 and the condensate will then run back into the vessel 1 where it will once again be vaporized and the process repeated. Assuming that the insert has good heat-conductivity and is therefore made of suitable thin material, considerable heat can be rapidly transferred from hot-plate to foodstuff. However, it has also been found that the water level at the bottom of the vessel may be so high that the unit 4 is partially immersed without the heating and cooking processes deteriorating. However, if the water level is too high the thin insert may be disturbed by the vigorously boiling water and start vibrating in the casing which may be a drawback in certain cases.

As shown in FIG. 1, the process takes place under a lid in order to reduce the heat losses, especially if the space between the unit 4 and the wall of the cooking vessel is large.

When cooking is complete the unit 4 may suitably be lifted out of the cooking vessel 1, for instance with the help of a separate handle which can be fitted on to the ring 8 at an attachment means 17. The unit consisting of the insert 5 and the casing 6 may now be placed directly on the table for serving. However, the insert 5 alone or the unit 4 may also be placed in an outer bowl shaped to fit the insert or the unit—possibly also having a lid—from which the food can then be served. If not all the food is consumed, either the insert 5 alone or the complete unit 4 may be used as a storage container for the left-over food, for instance in the refrigerator or freeze-box. Leftovers stored in this manner can then be placed in the cooking vessel and reheated to serving temperature, using a smaller quantity of water 10, upon a later occasion.

Figure 11:
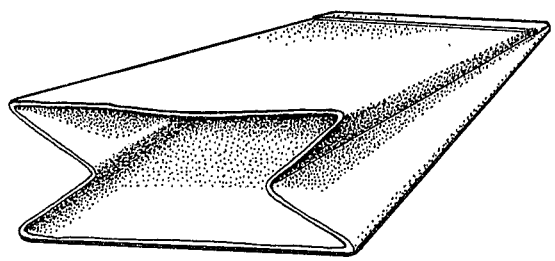
FIG. 11 is a view of a bagshaped insert according to the invention.
Figure 12:
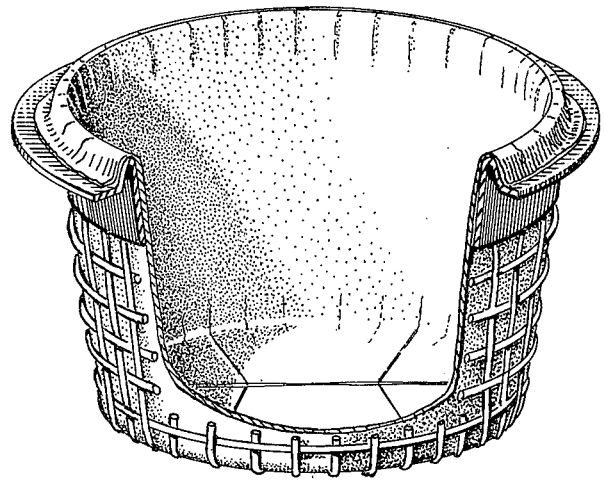
FIG. 12 is showing the insert of FIG. 11 arranged in a casing.

Since the insert proposed according to the invention suitably consists of a thin-walled material which in itself need not have particularly good mechanical properties such as stiffness, or even have high heat-resistance, it is possible to mass-produce the inserts inexpensively. Since also an inexpensive material such as plastic or aluminum foil can be used, inserts manufactured in this way would be extremely suitable as disposable products. The insert 5 can suitably be given an appropriate shape in relation to the casing at the time of manufacture. According to one embodiment of the invention the insert is made of aluminum foil preshaped to a bowl to fit the shape of the casing. Another suitable construction of the insert 5 is in the shape of a bowl or trough shaped insert manufactured by means of thermo-forming, for instance vacuum-forming of plastic foil. Such inserts have the advantage that they can be made relatively stiff, at least at the top, to facilitate handling. In a third embodiment the insert 5 may be made of a plastic film in the form of a bag or the like, shaped to fit inside the casing. This latter embodiment has the advantage that it can easily be folded flat for storage. The bag-shaped inserts, a model of which is shown in FIG. 11, can be made according to the well known technique of making liquid-tight plastic bags similar in the nature of shopping bags or bags utilized for storing deep frozen vegetables etc. Such a bag made of a thin flexible material placed in the casing as shown in FIG. 12 and filled with for instance the liquid to be boiled, will, due to its flexibility, assume a shape conforming to the shape of the casing. The upper edge of the bag can be folded over the edge of the casing and fixed in position by a holding ring.

Irrespective of whether the insert 5 and casing 6 are to be used for preparing food, storing food or heating up food, the insert can be thrown away after use since it can be made so inexpensively. The cooking utensils need not therefore be cleaned after use, nor of course need the serving dish in which the insert or the unit is placed for serving or keeping the food. According to the invention it has been found that food can be cooked many times in succession in the same cooking vessel without the vessel having to be washed. This is a great help in the housework, particularly when preparing dishes which tend to leave deposits on the walls of the cooking vessel which are difficult to remove.

As will be described below, the cooking time and energy consumption is approximately the same when using the means according to FIG. 1 as compared with traditional cooking. It has also been found that the method according to the invention offers certain other considerable advantages. Thus, burning does not occur, presumably because the surface temperature of the insert never exceeds 98°–99° C. or thereabouts. As is known, burning is usually caused by the foodstuff being heated locally to a high temperature. It has been found that milk, drinking chocolate, vegetables and fish boiled in this way do not boil over. It has also been found that eggs have less tendency to crack.

Furthermore, it has been found that by using the disposable insert proposed in accordance with the embodiment shown in FIG. 1, for instance, vegetables and fish, for instance, can be steamed. The foodstuff is in this case placed in the insert without water and cooked with the lid on. Direct steam will then find its way between the unit and the wall of the cooking vessel and pass over the upper edge of the unit to condense on the walls and the surface of the foodstuff. Thus, not only is the advantage gained that the cooking vessel is not dirtied by using the insert proposed, but at the same time the advantages associated with steaming certain foodstuffs are also obtained, namely that the flavor is retained better. Steaming generally takes somewhat longer than boiling in accordance with the method described above, however.

Figure 2:
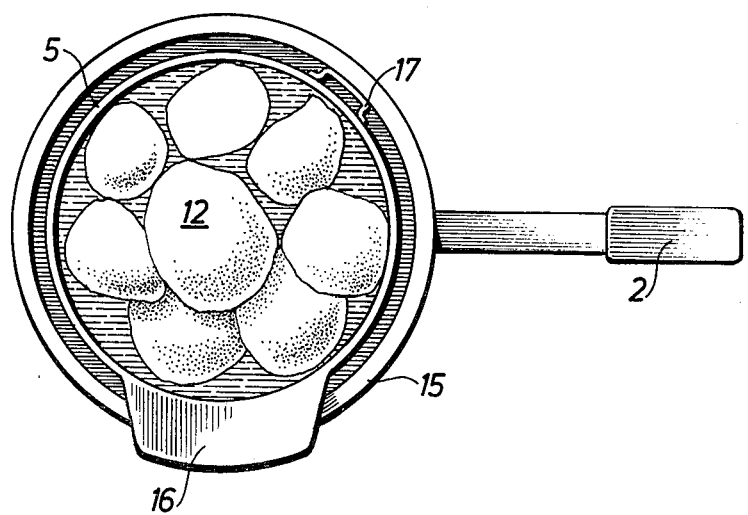
FIG. 2 is a view from above of the means shown in FIG. 1.

The insert 5 shown in FIG. 1 is preferably provided with a pouring lip. FIG. 2 shows the means according to FIG. 1 seen from above with the lid removed. The insert 5 has in this case been provided with a pouring lip 16. This fits over the ring 8 of the casing and also preferably bridges the gap between the edge 8 and the lip of the cooking vessel 15. This pouring lip 16 enables the contents of the insert to be poured out while the insert is still in the cooking vessel, without cooked food dirtying the vessel or the casing 6. Even if the unit 4 is lifted up out of the vessel 1, the lip 16 provides protection against dirtying if the contents is poured out of the casing 6, for instance with the help of the detachable handle mentioned above, or in some other way. The pouring lip 16 shown in FIG. 2 is only one example. The pouring lip 16 may of course be constructed in other ways. Another pouring edge may for instance be placed opposite the one shown in FIG. 2. However, it is advisable for the pouring lips 16 to be arranged to permit a certain passage of steam from the space 13 to the inside of the insert 5. As mentioned earlier, a detachable handle may also be arranged for application on the casing 6. An attachment means 17 to take such a handle has been indicated in FIG. 2. Similar attachment means 17 may suitably be distributed around the periphery of the ring 8, possibly serving at the same time as spacers between the casing 6 and the walls of the cooking vessel 1.

Figure 3:
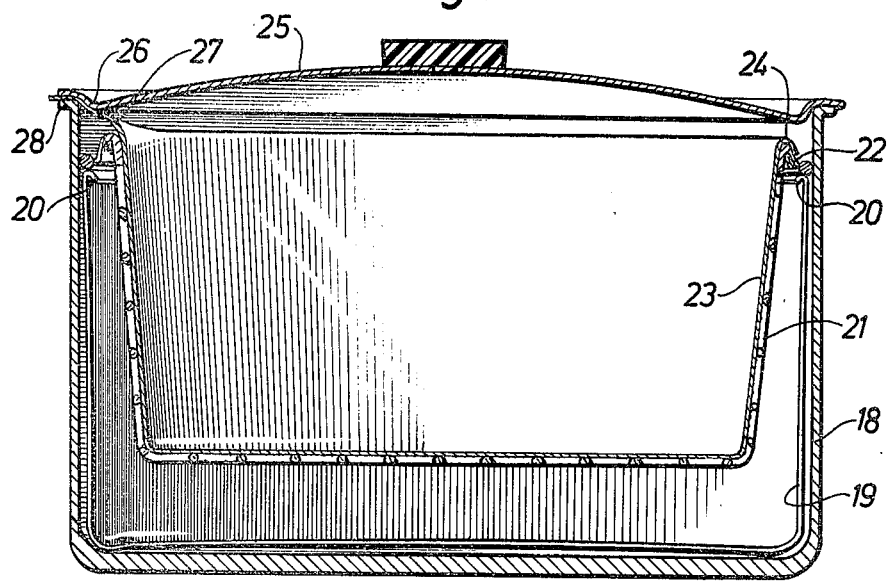
FIG. 3 is a section through a second embodiment of the invention.

FIG. 3 shows a second embodiment of the invention. Here the cooking vessel is designated 18 and a support means 19 is arranged therein. The supporting holder has an upper edge 20. The support means 19 may comprise a number of legs made of sheet-metal, for instance, which are bent upwardly and inwardly as shown in FIG. 3. The casing, preferably consisting of a wire basket or a perforated material, is designated 21. The casing 21 has a flange directed outwardly and downwardly, this flange being designated 22. The flange is arranged to rest on the edge 20 of the support leg. The flange 22 of the casing 21 is also perforated or consists of mesh so that steam can pass through it. It is obvious that the casing 21 with its flange will be positioned centrally in the vessel 18. An insert 23, for use once only, is placed in the casing 21. In the embodiment according to FIG. 3 the insert 23 has a flange 24 which fits at least partially over the flange 22 of the casing 21. A lid 25, preferably provided with a drip edge 26 is placed on the cooking vessel 18. Even in this case the thin insert 23 is suitably provided with one or more pouring lips. One such pouring lip is designated 27 in FIG. 3. Since the insert 23 is made of a thin, yielding material, the pouring edge 27 can be shaped to fit the drip edge 26 of the lid 25 to form a seal between the flange 28 of the cooking vessel and the corresponding outer edge of the lid 25.

As with the embodiment shown in FIGS. 1 and 2, water is poured into the vessel 18 to a suitable level. Here also heating up and boiling occurs both by means of heat transfer by steam condensing and also possibly by heat conducted directly from the water at the bottom of the cooking vessel 18 to the unit comprising casing 21 and insert 23 suspended in the vessel 18. The embodiment according to FIG. 3 has certain advantages over that shown in FIGS. 1 and 2. When preparing purees and sauces it is often necessary to beat the mixture either during or after cooking. Difficulties may arise in the embodiment according to FIG. 1, especially if the disposable insert is very thin and yielding as when it is made of aluminum foil. In such a case the insert with its contents may be drawn in during beating so that it loses contact with the casing. This may result in the insert folding down into the mixture which then spreads over the edge of the insert, thus dirtying the casing and the cooking vessel. The embodiment according to FIG. 3 has the advantage, among others, that the flange 24 holds the top of the insert in contact with the flange 22 of the casing 21 thus permitting even vigorous stirring or beating. In all the embodiments shown so far it is preferable for the inserts and also the casings to be designed so that they can be stacked one inside the other. Even in the embodiment according to FIG. 3 it is advisable for the flange 24 to be shaped so that the inserts can be stacked.

Figure 4:
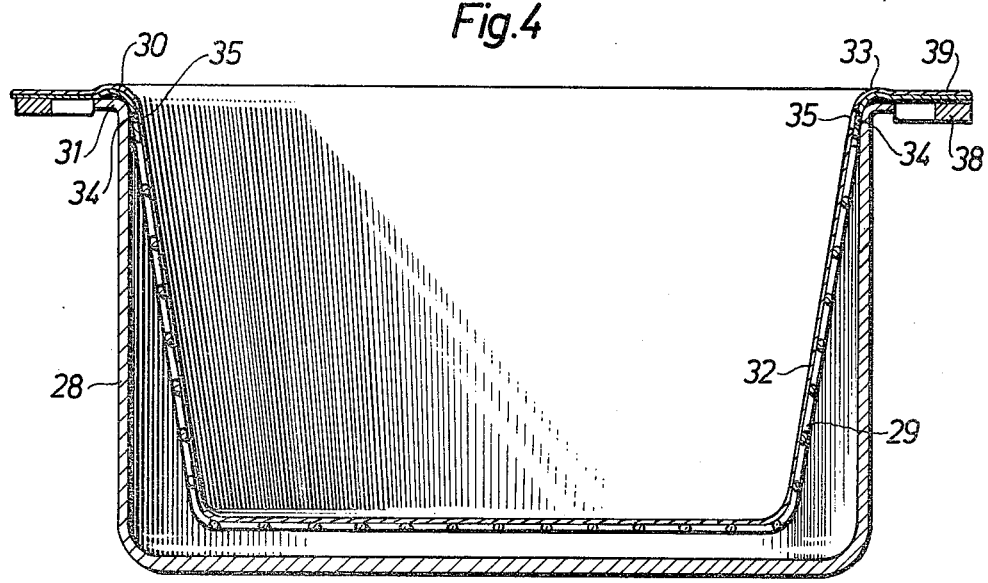
FIG. 4 is a section through a third embodiment of the invention.

FIG. 4 shows another embodiment of the invention. A casing 29 is arranged in a cooking vessel 28, the upper part 30 of the casing 29 fitting over the upper part 31 of the vessel 28. A disposable insert 32 is placed in the casing 29. The insert 32 also has an upper flange 33 which fits over the flange 30 of the casing 29. The casing 29 is perforated and at least the lower part preferably consists of a mesh basket of suitable material.

The protruding part 30 of the casing 29 may consist of homogenous material but in this case steam apertures 34 should be provided at least at certain points in the collar. Holes or slits 35 are suitably arranged in the same manner in the disposable insert 32, this also being designed so that the slits 35 can easily be positioned over the steam apertures 34.

FIG. 5 shows the means according to FIG. 4 seen from above. In this embodiment the upper flange 30 of the casing 29 forms two projections 36 and 37, which protrude over the flange 31 of the cooking vessel 28 and provide handles for lifting the casing 29. As shown in FIG. 4 the handles may suitably be provided with a heat-insulating section 38. The insert 32 can be similarly extended from the flange 33 so that the handle 36 is covered by the thin material of the disposable insert (see 39, FIG. 4). The embodiment according to FIGS. 4 and 5 has certain advantages over the embodiments shown previously. Due to the shape of the casing 29 no separate support means or centering means is required to position the casing 29 in the vessel 28. With the aid of the protruding handles 36, 37, which constitute extensions of the casing 29, the casing can easily be lifted out of and into the vessel 28 without the necessity of a separate handle. With the aid of the flanges 30 and 33 on casing 29 and insert 32, respectively, the insert 32 will be retained at the upper edge of the casing 29 during stirring. Since the insert 32 fits over the flange 30 of the casing 29 and also over the flange of the cooking vessel 28, the contents can be poured out without risk of dirtying the vessel 28.

The flange on the insert also stiffens the upper part of the insert making it easier to handle and to lift into and out of the casing with the foodstuff. In certain cases, therefore, the insert with the foodstuff can be placed on a suitable surface without the casing being used. In this case the extending parts 39 of the insert can be used as handles.

FIG. 6 shows a detail of the casing 29. The upper edge, with a flange 30, is provided with steam apertures 34 as mentioned previously. The rest of the casing consists of a mesh 40 of suitable material, relatively stiff in comparison with the insert. Since the insert 32 is also provided with protruding parts 39 corresponding to the handle 36 in the casing it is easy to guide the insert to such a position that the apertures 35 in the insert 32 communicate with corresponding steam apertures 34 in the casing 29. The apparatus according to FIGS. 4 and 5 can be provided with a lid in suitable manner.

As mentioned earlier, it is important that at least the casings 29 are shaped so that they can be stacked into each other during storage. Since the disposable inserts with their casings are to be used according to the invention not only for cooking, but also for storing and serving food, there must be several casings to fit one size of saucepan in a household. According to the invention the casings are designed so that they can be stacked inside each other to require a minimum of space. As shown in FIGS. 1, 3 and 4, both insert and casing have been made slightly conical to facilitate stacking.

The invention also covers the use of the disposable inserts for storing food prepared earlier, as mentioned above. FIG. 7 shows a means for serving or storing food using the same disposable insert as previously used for preparing the food. The disposable insert 32 shown in FIG. 7 with the casing 29 or 40 has the same shape as previously shown in FIGS. 4 and 5. The insert 42 with casing 40 is in FIG. 7 placed in a bowl-shaped outer dish 41. Because the bowl is suitably shaped, the insert 32 with its casing will remain suspended and centered in relation to the bowl wall so that a space 42, 43 is formed. This provides good heat-insulation. A lid 44 is placed on the vessel 41, preferably having a handle 45. The dish 41 is preferably also shaped so that several dishes can be stacked one into the other. The lid 44 should also preferably be stackable. In the embodiment shown, furthermore, another dish 41 with its contents can be stacked on top of a similar serving dish with lid 44 if the bottom of the dish is provided with a raised section 46 fitting into the handle 45 of the lid below. Of course, the method of stacking shown here is only one example out of many possible embodiments. In many cases it is convenient for the insert without casing to be placed in a dish, with lid, designed to fit the shape of the insert, for instance for serving or storing after cooking. This dish may be double walled to provide good heat insulation. The inner wall of the storage dish may possibly be perforated or consist of mesh.

Thus in the complete system according to the invention for preparing, keeping, serving and reheating food, one and the same disposable insert can be used. The system is exemplified in the following manner referring to the means according to FIGS. 4, 5 and 7.

A suitable cooking vessel for preparing food is taken out, together with the casing and disposable insert belonging to it. The disposable insert is lowered into the casing in such a way that the steam apertures cover each other. The unit consisting of casing and insert is placed in the cooking vessel after a suitable quantity of water has been poured in. The food to be cooked is placed in the insert. The lid is then placed on the cooking vessel and the boiling process is initiated, being performed as described above. The quantity of heat is thus regulated according to how much excess steam escapes between the edge of the lid and the vessel or through special holes in the lid.

In the embodiments according to FIGS. 4 and 5 cooking may also be performed without a lid since the steam looses will be relatively small assuming that the steam apertures are not too large.

When the food is ready it can, of course, be served straight from the cooking vessel. However, for many reasons it is preferred to use the storage and serving system proposed within the scope of the invention. In this case the unit is for instance lifted out of the cooking vessel 28 according to FIG. 4 and placed in the storage and serving dish 41 according to FIG. 7. If the food is not to be consumed immediately it should be covered with the lid 44. The lid 44 may possibly be provided with extra heat insulation. It has been found that newly cooked food can be kept hot for a relatively long time in the outer dish 41 described in FIG. 7.

If the food in the dish 41 is only partially consumed, the dish together with unit and contents can be used for storage in refrigerator or deep-freeze. If the food is to be reheated, the unit is lifted out of the outer dish and once again placed in a cooking vessel, after which the food can be quickly reheated as described earlier. The unit can then once more be lifted out of the cooking vessel and placed in the serving dish. When the food is consumed the disposable insert is removed from the casing and thrown away.

Thus, as described above, within the scope of the invention, the thin, disposable insert has protected the cooking vessel from becoming dirty during preparation of the food as well as protecting the storage dish from becoming dirty during serving and if stored. The invention thus also covers a method, using inexpensive, thin, disposable inserts which are strengthened and stiffened by being combined with a casing permeable to steam and water, of utilizing the disposable insert so that the foodstuff will be kept in the same insert during preparation, storage and serving. This not only avoids cleaning the cooking vessel, but also the storage vessel. Furthermore, there is less waste since the foodstuff does not have to be transferred from one vessel to another.

So far a means according to the invention has been described in which water is poured into the bottom of a traditional cooking vessel in order to cook foodstuff by steaming when heat is applied. The invention also covers other methods and means for cooking using disposable inserts. It is, for example, possible to use means other than those described for applying heat and producing steam. The invention can thus be used to cook food in special cooking apparatus which can be automated to a certain extent in order to facilitate the cooking process. FIG. 8 reveals such a device. In this FIG. 47 designates a cooking vessel placed on a hot plate 48. 49 designates a casing similar to that described previously. A disposable insert 50 is placed in the casing 49. A lid 51 fits over the vessel 47. The base 52 of the cooking arrangement according to FIG. 8 includes a means for producing steam. This is not shown in FIG. 8 but may comprise an electric coil of the type employed in automatic coffee-making machines. A container 53 for liquid is placed above the steam generator. A steam channel 54 provided with a suitable connection at 55 directs steam to the space between the wall of the vessel 47 and the casing 49. The steam produced is condensed while at the same time transmitting heat to the outer surface of the insert 50. Steam also passes through apertures in the insert to heat the food to be cooked.

The condensate runs down to the bottom of the vessel 47 and is vaporized again by the heat from the plate 48. The device is preferably provided with a dispensing means for the continuous supply of water and steam is adjustable quantities. The device is also preferably provided with a timer and thermostat. The latter can be set in suitable manner so that a suitable rate of vaporization is obtained from the bottom of the cooking vessel. Among the advantages obtained with an arrangement like the one shown in FIG. 8 include the fact that the cooking process can be automated by using the thermostat and time-setter. Furthermore, the water is brought to boil quickly since the quantity of water is adjusted to the capacity of the vaporizer and vigorous production of steam will be obtained shortly after the machine is started. The water supply to the vaporizer may be controlled by a timer. The use of a thermostat combined with the vaporizer prevents boiling dry. Instead of a timer to control the water supply, the quantity of water poured into the container 53 may be adjusted to the desired cooking time. This can easily be achieved since the water container 53 is preferably transparent and marked with graduations 53a.

The device shown in FIG. 8 is only one example of the many ways within the scope of the invention of making use of the great advantages gained by the use of thin, disposable inserts of the type described earlier, combined with the reinforcing casing.

It has been mentioned earlier that the disposable inserts should be liquid-tight and have good heat-conductivity. In some cases a metal foil, such as aluminum, is a suitable material. In other cases, however, drawbacks have been found to be associated with the use of aluminum foil. It is for instance difficult to shape aluminum foil other than by pleating it to provide the vertical walls of the insert. However, the wall of the insert then has poorer heat-conductivity than the bottom. Thus aluminum foil which per se has excellent heat-conductivity, has certain other drawbacks. If the foil is thin, small holes may easily be caused by corrosion, steam or by acids in, for example, vegetables. It is therefore advisable to coat the foil by lacquering or laminating it with a film of plastic in order to improve the anti-corrosion properties. At the same time the foil is also strengthened. However, such materials are relatively expensive and there remains the problem of shaping the foil, particularly in the case of inserts having a flange as shown in FIG. 4.

Careful studies have shown that in certain cases a plastic film or foil is suitable for making the disposable inserts, assuming of course that the material is suitable for contact with foodstuff. Although plastics such as polyolefins, polystyrenes, styrene/butadienes, PVC, all of which are suitable for hot-moulding, have considerably poorer heat transmission coefficient than aluminum, for instance, it has been found that satisfactory results can be obtained using disposable inserts made of such material under the assumption that the heat-conductivity is maintained by making the insert sufficiently thin. Disposable inserts have been made from HD-polythene by means of thermo-forming, for instance, with very good results. It has been found that a special type of HD-polythene, namely, a so-called HD-HM-polythene has given extremely satisfactory results since the material is suitable for thermo-forming and the walls can be made extremely thin so that the insert can easily be bunched up after use so that the used moulded insert does not take up much space. An insert can be made from this material which has a wall-thickness of about 0.01 mm at the thinnest part. Conventional forming techniques of course enables adjustment of the wall-thickness of the insert to suit its function so that the upper parts of the insert are slightly thicker to provide a certain stiffness. A wall-thickness as thin as 0.01–0.06 mm offers great advantages in the form of good heat-conductivity, little consumption of material and easy compressibility upon disposal. On the other hand such an insert may be difficult to handle in certain cases, not the least during manufacture, and it is therefore sometimes preferable for the insert to have considerably greater wall-thickness. Greater thickness is also to be preferred if the inserts are to be used without a supporting casing. The foil used may in such cases have a thickness of up to 2 mm, although this is not desirable, partly for reasons of cost.

Good heat-conductivity is also obtained in inserts manufactured by means of thermo-forming since the vertical walls of the insert are smooth and better heat-conductivity is obtained than with a pleated aluminum foil wall. The advantage of a thin disposable insert is of course not only that of good heat-conductivity. It is important that the disposable insert is inexpensive and since the cost of material is a major part of the manufacturing costs for disposable inserts, a thin insert is also desirable from the cost point of view. A third advantage is also gained, as mentioned, and that is that if the disposable insert is thin it can easily be crushed together when thrown away, so that it occupies very little space in the refuse bin.

HD-polythene has previously been mentioned by way of example as suitable for inserts made by means of thermo-forming. This is, however, only one example. Many other plastics materials suitable for forming to the desired dimensions can also be used within the scope of the invention. When vacuum-forming a thin plastic film or foil, for example, it may also be advisable for the insert to have greater thickness at the upper edge than at the bottom and the lower portions of the sides. In this case the advantages of good heat-conductivity, low weight and easy crushability are obtained while at the same time the upper edge is given a certain stiffness since the material is thicker there as well as being reinforced by the formation of a flange. The stiffness in the upper edge facilitates handling of the disposable inserts.

As emphasized previously, it is important that the disposable inserts do not weigh too much, not the least from the cost point of view. It may be mentioned that disposable inserts having a volume of 1 liter which were manufactured according to the invention from various materials were found to have the following weights:

| Material | Initial Thickness, mm | weight, g |
|---|---|---|
| Aluminum | 0.025 | 3.5 |
| Vacuum-formed polypropylene | 0.45 | 11.0 |
| Vacuum-formed polythene | 0.18 | 4.5 |
| Vacuum-formed polythene | 0.15 | 3.7 |

As the table shows, a disposable insert of polythene, for instance, can be made with substantially the same weight as a corresponding insert of aluminum foil.

As mentioned earlier, extensive studies have been made in preparing food by boiling in accordance with the invention. The studies have also covered comparison with boiling in water in the traditional manner. Steaming has also been tried, that is to say without liquid in the insert. The following offers some examples of experiments performed, cooking in various ways in accordance with the invention and comparing the results with traditional boiling. The cooking process is described in the form of a temperature-time chart.

In all the examples the process has been divided into a stage in which the water was brought to a boil with maximum heat in the form of electrical heating and, after a certain time, a stage with less heat supplied, this being the same for all the examples given below.

EXAMPLE 1

In this example measurements were taken when boiling water in a normal cooking vessel with a lid, using 9.5 dl of water. Water was afterwards heated according to the invention in a disposable insert corresponding to the means according to FIG. 4, by way of comparison. The quantity of water in the insert was 7 dl and in the bottom of the vessel 2.5 dl. The disposable insert was made of aluminum foil having a thickness of 0.025 mm. A third experiment was performed using the same quantity of water and the same disposable insert, but with the bottom of the insert somewhat immersed in the water at the bottom of the cooking vessel. A thermometer was secured to the lid of the vessel with the operative portion at the same level below the surface of the liquid in all the experiments. In all three experiments the heat supplied during the boiling up stage comprised 1200 Watts from an electric hot plate for a period of 8.5 minutes, after which the heat was reduced to 600 Watts. FIG. 9 reveals the temperature-time chart. From this it is clear that the boiling up stage was slightly different for traditional boiling and for the two methods according to the invention. After approximately 12–13 minutes total cooking time a constant state is obtained. As is clear from the example shown, a negligibly higher temperature is obtained for traditional boiling than for boiling in an insert of aluminum foil. On the other hand, apart from the boiling up stage, the same temperature was obtained whether the disposable insert is immersed in the liquid at the bottom of the cooking vessel or not. As mentioned, the boiling up stage took slightly less time for traditional boiling. The same is true for boiling up with an immersed insert. This is probably because better heat-conductivity is obtained during the first stage of the heating through direct contact than if the insert is not immersed. However, the difference in heating rate only applies up to 70–80°, after which it is probably immaterial which of the embodiments is used.

EXAMPLE 2

FIG. 10 shows another series of experiments by means of a temperature-time chart. In this case boiling has been performed using inserts of three different types as well as traditional boiling. As in example 1, the total quantity of water in each case was 9.5 dl. The temperature-time chart is shown in FIG. 10. The means used corresponded substantially to that shown in FIG. 1 but without a lid. The heat supplied and the time interval during boiling were the same as in the experiments described earlier in connection with FIG. 9. First of all, it may be ascertained that there is a slightly greater temperature difference between the curve for traditional boiling (70) and that according to the invention. It can also be established that the curves are different for different materials.

The dot-dash-line curve 71 illustrates an experiment using aluminum foil for the insert having a thickness of 0.025 mm. The curve 73 shown as a dotted line illustrates a vacuum-formed insert of HD-polythene having an initial thickness of 0.18 mm. The broken-line curve 72 shows an insert made of vacuum-formed polypropylene having an initial thickness of 0.45 mm. It can be seen that the aluminum foil and the polythene have very similar curves whereas the polypropylene shows a more deviating course.

As also mentioned, extensive studies have been made in preparing foodstuff in accordance with the invention and comparisons have been made with boiling in the water in traditional manner. In all cases the foodstuff was cooked using the same boiling course for traditional boiling as in accordance with the invention. Samples were then taken and the result tested. Testing was both visual and by tasting. Sampling was performed by a jury who gave their verdicts without knowing the manner in which the food had been cooked. The result showed that potatoes, vegetables, meat and fish, i.e., food requiring relatively long cooking times, did not differ in the cooking time according to the invention or for traditional cooking. In the preparation of food requiring only a short period of heating up, such as readymade soups or boiling eggs, slight differences in cooking time have been observed, i.e., it has taken slightly longer with the method according to the invention. However, the differences are such that they must be considered insignificant in comparison with the great advantages gained by the method according to the invention. It has been found that deep-frozen foods can be thawed by placing them in the insert and then heating them by means of steam from the water in the bottom of the cooking vessel, for instance. An extra high supply of heat should be used for quick thawing. Due to the great temperature differences between the cold food and the steam, considerable quantities of steam will be condensed, thus resulting in rapid thawing.

Also included in the system for preparing, serving and storing food or the like within the scope of the invention is deep-freezing goods in a mould shaped to fit the insert, so that when placed in the insert, preferably without wrapping for deep-freezing, the deep-frozen product has good contact with the walls of the insert to facilitate thawing. In certain cases, the food can be frozen and stored directly in inserts which can then be placed in the casing for thawing and possibly also preparing, serving and keeping in the same insert.

The insert proposed according to the invention may also suitably be made in the form of a bag, preferably kept substantially flat until required for use.

Experiments have unexpectedly shown that when using inserts of extremely thin plastic film, a temperature-time chart can be obtained which, with respect to the cooking process, coincides with the corresponding temperature-time chart for traditional boiling.

Although the present invention has been described in connection with a preferred embodiment thereof, many variations and modifications will now become apparent to those skilled in the art. It is preferred, therefore, that the present invention be limited not by the specific disclosure herein, but only by the appended claims.

I claim:

1. Apparatus for use with a cooking vessel and including a removable lid for heating solid and liquid foodstuffs either separately or together while spacing the foodstuff from the bottom and walls of the cooking vessel used to heat the foodstuff comprising:

said vessel having an upper open end for receiving the removable lid and adapted to receive and contain water for heating;

a holder received by said vessel and having a bowl-shaped perforated portion and an upper portion for supporting the holder in said vessel so that the side wall and bottom of the bowl-shaped perforated portion are respectively spaced from the side wall and bottom of said vessel;

an insert positioned in said holder;

said insert being a liquid-tight bowl-shaped disposable plastic member thermoformed so as to have a thin bowl-shaped body defined by a continuous sidewall and an integral bottom;

the upper part of said bowl-shaped body being formed with an integral annular flange disposed generally outward and away from said insert wall and shaped to at least partially engage the upper edge of said holder, said flange being semi-rigid and sufficiently strong such that it cooperates with said thin bowl-shaped body to support and hold said insert upon the holder without the need for any additional holding means when said flange is in engagement with the upper edge of said holder;

the continuous side-wall and integral bottom of the insert bowl-shaped body conforming respectively to the side wall and bottom of the holder to smoothly and substantially intimately engage the inner surface of the holder without having to be folded, enabling the heated fluid in the vessel and located between the vessel and the holder to intimately engage substantially the entire exterior bowl-shaped surface of the insert, the thickness of the insert being chosen to maximize heat transfer to the foodstuff through the insert.

2. Apparatus as claimed in claim 1, wherein said insert is made from a plastic film having a thickness of between 0.01-2 mm.

3. Apparatus as claimed in claim 1, wherein the upper edge of said insert is provided with a reinforced portion.

4. Apparatus as claimed in claim 1, wherein the continuous side wall of said insert is generally conical in shape to facilitate stacking.

5. Apparatus as claimed in claim 1, wherein the flange section is designed at least partially to cover the gap between the insert and the wall of the cooking vessel to enable the foodstuff to be poured out without spilling into the cooking vessel.

6. Apparatus as claimed in claim 1, wherein the flange of the supporting holder extends outwardly at two opposing positions to form projections adapted to serve as handles said insert having portions of said flanges extending outwardly and resting upon said projections.

7. Apparatus as claimed in claim 1, wherein an outer container is provided and a unit composed of the insert is adapted to be fitted into said outer container which is thereby usable as a dish for both serving and storage.

8. The apparatus of claim 1 wherein the upper end of the insert including at least said flange has a thickness greater than the sidewall and bottom of the insert to further strengthen said insert.

9. The apparatus of claim 1 wherein the thinnest part of the insert bowl-shaped portion has a thickness no greater than 0.060 mm.

10. The apparatus of claim 1 wherein the insert is provided with openings in the region of the upper end of the sidewall to permit steam to pass therethrough and thereby aid in heating the foodstuff.

11. The apparatus of claim 1 wherein the insert is formed from a plastic material taken from the polyolefin group.

12. The apparatus of claim 1 wherein the insert is thermoformed from a sheet of plastic material whose initial thickness is not thicker than 0.18 mm.

13. Apparatus as claimed in claim 1, wherein the insert is made of a thin material suitable for folding the bowl-shaped portion during storage prior to use and wherein the thickness of said insert enables it to be easily crushed and flattened to facilitate disposal.

14. Apparatus as claimed in claim 1, wherein the insert is provided at its upper edge with an outwardly directed flange to position the insert upon the cooking vessel and the supporting holder.

* * * * *